June 22, 1965  K. M. SANO ETAL  3,191,031
APPARATUS FOR UNLOADING FILM SHEET CASSETTES
Filed Jan. 9, 1962

INVENTORS
KAREL MARCEL SANO
AND FREDERIK JULIAAN VAN LANDEGHEM

BY *John J. Dennemeyer*

ATTORNEY

United States Patent Office 3,191,031
Patented June 22, 1965

3,191,031
APPARATUS FOR UNLOADING FILM
SHEET CASSETTES
Karel Marcel Sano, Borsbeek-Antwerp, and Frederik Juliaan Van Landeghem, Mortsel-Antwerp, Belgium, assignors to Gevaert Photo-Producten N.V., Mortsel-Antwerp, Belgium, a Belgian company
Filed Jan. 9, 1962, Ser. No. 165,192
Claims priority, application Great Britain, July 21, 1961, 26,584/61
7 Claims. (Cl. 250—68)

The present invention relates to a method and an apparatus for unloading film sheet cassettes. The invention has been made more particularly to permit exposed X-ray film sheets to be unloaded from such cassettes in an undarkened room.

Some apparatus are already known which operate in an undarkened room to unload one or more film sheet cassettes, comprising the opening of the cassette, removing the exposed film and introducing this film into an adapted processing device in which said film is conveyed at a uniform speed through the subsequent treating baths for developing, fixing and rinsing. In these known unloading apparatus the film sheets are removed from the successive cassettes by a suitable gripping mechanism and then passed between a pair of discharge rollers for withdrawing same from the unloading apparatus, and/or for introducing them into the processing device. In this respect we refer to our U.S. Patents 3,105,903 and 311,585.

These apparatus show the disadvantage that the successive film sheets are not passed to the processing device in close order but follow one another at appreciable intervals of time. This is due to the time which is required to pre-position, unlock and open each cassette, which operations take place while the film sheet removed from the previous cassette is moving continuously forward.

It is the object of the present invention to achieve an improvement in this respect.

Indeed, a method has been devised for the automatic unloading of film-sheet cassettes, in particular for X-ray film, where film sheet cassettes are unloaded one after another, the film sheets being withdrawn from the cassettes and advanced for subsequent processing with the aid of conveying roller pairs, the method being characterized in that during at least part of its withdrawal motion each film sheet is moved at a higher speed than the speed of its subsequent motion in the following processing device.

The invention includes cassette-unloading apparatus for carrying out the new method, such apparatus preferably including in addition to at least one pair of rollers for withdrawing the film sheets from the cassettes, at least one pair of rollers for further conveying the sheets to a subsequent processing device, means being provided for imparting to the first said rollers an increased speed relative a following said pair of rollers. By virtue of the more rapid withdrawal of the film sheets the cycle of motion whereby a cassette is pre-positioned, unlocked and opened may be repeated at shorter intervals of time. As in a continuous film-processing system the films must advance at a controlled uniform speed, this means that more film sheets are processed in a given time due to the successive sheets being closer together. The higher speed of withdrawal may be chosen so that the film sheets upon leaving the unloading apparatus, are closely spaced, e.g., by one or two inches.

A constructional example of the invention is illustrated in the accompanying diagrammatic drawings, without limiting, however, the scope of the invention thereto.

FIG. 1 shows a light-tight apparatus for unloading film sheet cassettes. More particularly the gripping mechanism or system for withdrawing the film sheets from the cassettes as well as the system for conveying the removed film sheets outside the apparatus, are represented in this figure.

Figure 1:
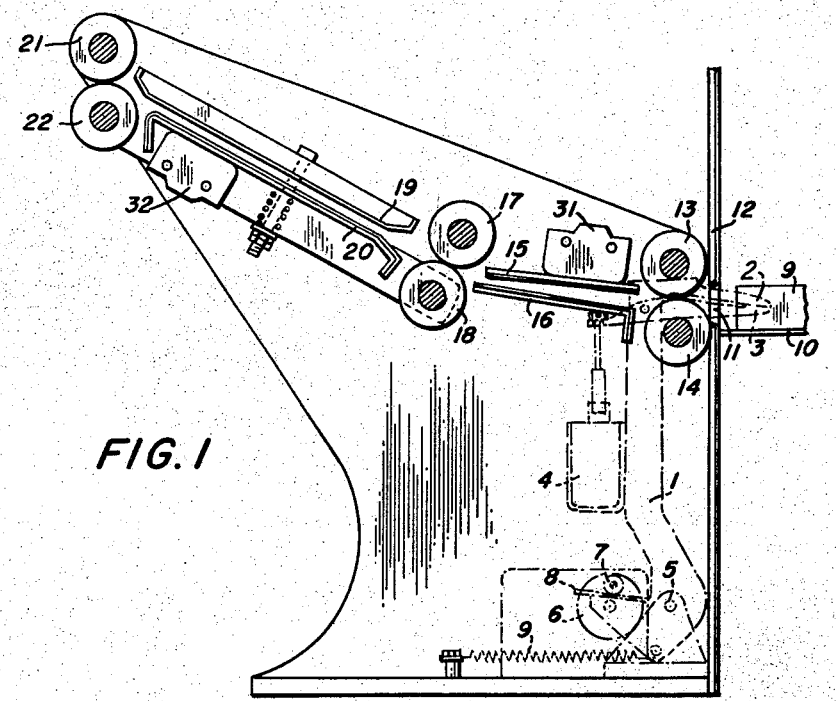
FIG. 1 is a side view of the unloading apparatus according to the example.

The gripping system 1 comprises two jaws 2 and 3. The jaw 3 is movably fitted in respect to jaw 2 and controlled by a solenoid 4. This gripping system is pivotably mounted at 5 and is urged in a clockwise direction by the spring 9. By the rotative action of the disc 6, bearing eccentrically a small roller 7 which moves over the surface 8 of the gripping arm, the gripping arm is rocked towards and away from the wall 12.

The cassette 9 containing the exposed film sheet to be withdrawn is positioned on a horizontal plate 10, before the slot 11 in the wall 12.

An apparatus for positioning a cassette in front of the gripping system 1, unlocking and opening the cassette, is disclosed, among others in our U.S. Patents 3,105,903 and 311,585. Such a device for performing the aforesaid operation is not shown in the accompanying drawings, nor mentioned in the example since it is not necessary for the clear understanding of the operation which will be described hereinafter.

Immediately behind the inlet slot 11 are fitted a roller pair 13–14, a set of guide plates 15–16, a roller pair 17–18, a set of guide plates 19–20 and a discharge roller pair 21–22. The roller pair 13–14 is divided in the middle to allow the movements of the gripping mechanism 1 described hereinafter. According to the invention the driving of the roller pairs 13–14 and 17–18 is arranged in such a way that in respect to the discharge roller pair 21–22 the former roller pairs are capable of rotating at a temporarily increased peripheral speed. Thereby the film sheet, after its withdrawal from the cassette by the gripping mechanism 1 and its introduction between the first roller pair 13–14, is conveyed at an increased speed between the respective guide plates until a short distance of the preceding film sheet which is passing between the discharge rollers 21–22 at the normal speed of the subsequent processing device.

Figure 2:
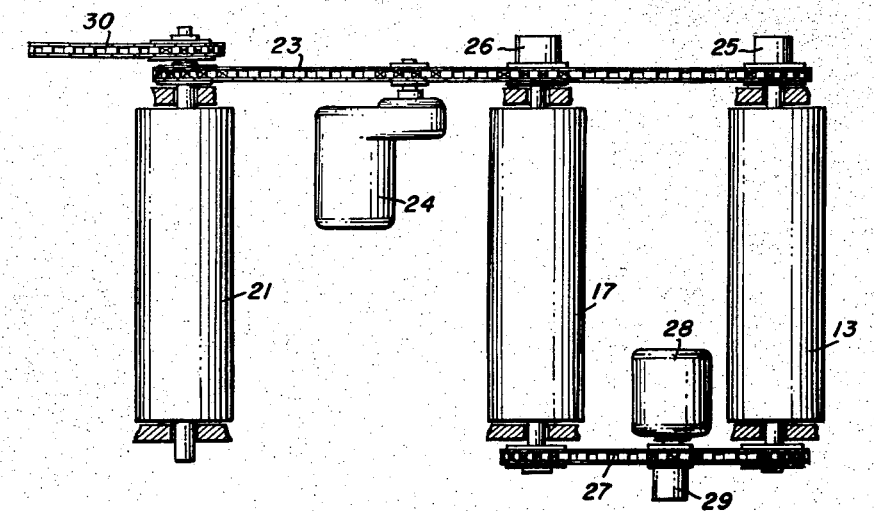
FIG. 2 is a schematic top view of the driving system for the several roller pairs.

The driving of the roller pairs is represented by the diagram of FIGURE 2. In this figure is shown that the free travel couplings 25, 26 and 29 permit the sprocket wheels to rotate at a higher speed than the shaft of the respective rollers.

A first driving occurs by means of the motor 24 which is continuously turning at the normal speed so that the rollers 13, 17 and 21 are driven over the chain 23. The free travel coupling 29 permits the chain 27 to run free at a speed of the rollers 13 and 17, the motor 28 being out of action.

The second driving at "increased speed" occurs by means of the motor 28; as the speed of said motor is higher than the speed of the motor 24, the chain 27 is running at the corresponding speed of the motor 28, so that the rollers 13 and 17 are driven at the increased speed. Free travel couplings 25 and 26 permit the motor 24, and consequently the roller 21, to maintain their normal speed.

The chain 30 is running from the discharge roller pair 21–22 to the developing device and controls the equality of the peripheral speeds of both the discharge roller pair 21–22, and the conveying roller pairs of the processing device. If desired, the driving of the roller pair 21–22 and consequently also the driving of the roller pairs 17–18 and 13–14 over the chain 23, can be assured by the chain 30.

In the latter case the motor 24 can be omitted. A suitable processing device for developing, fixing, rinsing and drying the film sheets is disclosed in our U.S. Patent No. 3,067,920.

Two microswitches 31, 32 are mounted on the guide plates and are operated by the film sheets. The microswitch 31 controls the device which positions the cassettes in front of the slot 11, unlocks and opens the cassettes, etc. When a film sheet has passed with its rear end underneath the switch lever of the microswitch 31, the contact of this microswitch switches over, thereby producing an impulse to indicate that the unloading operation of the cassette has ended so that a following cassette can be positioned for unloading.

The microswitch 32 controls the motor 28. As long as the switch lever of this microswitch is not pushed in by a film sheet, moving between the guide plates 19–20, this microswitch energizes the motor 28, and the roller pairs 13–14 and 17–18 are rotating at an increased peripheral speed with respect to the discharge roller pair 21–22. Once the switch lever of the microswitch 32 is pushed in by a film sheet, the motor 28 is de-energized and the roller pairs 13–14 and 17–18 continue rotating at the speed of the roller pair 21–22.

In the following example a complete unloading operation is described. When a cassette 9, positioned in front of the slot 11, has been unlocked and opened, the disc 6 starts to rotate and forces the gripping mechanism 1 to swing from a backward "rest" position towards a frontward gripping position. This gripping position is represented in the figure. At the moment that the open jaws 2 and 3 are directed over the front edge of the exposed film sheet to be withdrawn, the electric circuit energizing the solenoid 4 and thereby closing the jaws, is closed.

Next, the gripping mechanism is moving backward. The film sheet is withdrawn from the cassette and introduced between the rollers 13 and 14. Because the preceding film sheet has not been fully removed from the guide plates 19–20 at that moment, the microswitch 32 is still opened and the roller pairs 13–14 and 17–18 are rotating at the equal speed of the roller pair 21–22 viz. at a peripheral speed of 8 mm./sec. Since the speed of the backward motion of the jaws is higher than the peripheral speed of the rollers 13–14, even higher than the increased peripheral speed of these rollers, the motion of the film sheet is slackened at the moment the film sheet is seized by these rollers 13–14, whereby it is released from the jaws. The film sheet is slid between the guide plates 15–16 at a speed of 8 mm./sec. until the rear edge of the preceding film sheet releases the switch lever of the microswitch 32. At that moment the electric circuit of the motor 28 is closed and the roller pairs 17–18 and 13–14 are driven to rotate at an increased speed of 80 mm./sec. The film sheet between the guide plates 15–16 is conveyed at this increased speed until its front edge reaches the switch lever of the microswitch 32. The electric circuit of the motor 28 is then interrupted and the film sheet is further conveyed at a speed of 8 mm./sec. Owing to the temporarily increased conveyance speed, the relative distance of a film sheet in respect to the preceding film sheet has been overcome for the greater part. When the film sheets leave the discharge roller pair 21–22 they are ranged at substantially one inch distance from each other. At the moment the rear edge of the withdrawn film sheet releases the switch lever of the microswitch 31, the contact of this switch is switched over, and a new impulse is produced for starting the positioning of a following cassette in front of the gripping mechanism.

We claim:

1. Apparatus for successively unloading film sheet cassettes comprising a light tight housing having an inlet opening for receiving the film sheets and an outlet opening for discharging the film sheets, film conveyer means mounted in said housing adjacent said inlet and outlet openings, at least one intermediate film conveyer means mounted in said housing between said film conveyer means at said inlet and outlet openings, film guide means mounted between said film conveyer means, means for removing said film sheets from the open cassettes and for delivering the sheets to said film conveyer means at said inlet opening first driving means for operating said film conveyer means at a predetermined first speed, second drive means for operating said film conveyer means at said inlet opening and said intermediate film conveyer means at a predetermined second speed higher than said first speed, and means responsive to the passing of said film sheets over said guide means for operating said conveyer means at said inlet opening and said intermediate conveyer means at said predetermined faster speed.

2. Apparatus for successively unloading film sheet cassettes comprising a light tight housing having an inlet opening for receiving the film sheets and an outlet opening for discharging the film sheets, inlet conveyer rollers for the film sheets mounted in said housing adjacent said inlet opening, outlet conveyer rollers for the film sheets mounted in said housing adjacent said outlet opening, intermediate conveyer rollers for the film sheets mounted in said housing between said inlet conveyer rollers and said outlet conveyer rollers, film guide means mounted between said conveyer rollers, gripping means mounted in said housing adjacent said inlet opening, actuating means for operating said gripping means to grip the film sheets and deliver the sheets to said inlet conveyer rollers, first driving means for rotating said rollers at a predetermined first speed, second driving means for rotating said inlet rollers and said intermediate rollers at a predetermined second speed faster than said first speed, means responsive to the passing of said film sheets over said guide means adjacent said inlet conveyer rollers for actuating said second drive means to rotate said intermediate rollers and said inlet rollers at said predetermined second speed, and means responsive to the passing of the film sheets over said guide means adjacent said outlet rollers for stopping said second drive means to rotate said conveyor rollers at said predetermined first speed.

3. Apparatus for successively unloading film sheet cassettes comprising a light tight housing having an inlet opening for receiving the film sheets and an outlet opening for discharging the film sheets, a pair of inlet conveyer rollers for the film sheets mounted in said housing adjacent said inlet opening, a pair of outlet conveyer rollers mounted in said housing adjacent said outlet opening, a pair of intermediate conveyer rollers mounted in said housing between said inlet rollers and said outlet rollers, an inlet guide plate for the film sheets disposed between said inlet rollers and said intermediate rollers, an outlet guide plate for the film sheets disposed between said outlet rollers and said intermediate rollers, a pair of gripping jaws mounted in said housing adjacent said inlet opening, actuating means operatively connected to said gripping jaws for gripping the film sheets in the open cassette and for delivering the film sheets between said inlet rollers, a first drive motor connected to said conveyer rollers for rotating said rollers at a predetermined first speed, a second drive motor connected to said inlet rollers and said intermediate rollers for rotating said inlet rollers and said intermediate rollers at a second speed faster than said first speed, a first microswitch device mounted above said inlet guide plate and having switch means adapted to contact the film sheets passing over said inlet guide plate, said switch means being connected to start said second drive motor when the rear edge of the film sheets have passed thereunder, a second microswitch device mounted above said outlet guide plate and having a switch means adapted to contact the film sheets passing over said outlet guide plate, said switch means being connected to stop said second drive motor when the front edge of said film sheets passes thereunder whereby said inlet rollers and said intermediate rollers are rotated again at said predetermined first speed.

4. The apparatus according to claim 3 wherein said pair of inlet conveyer rollers are divided in the center to allow said gripping means to move backwards and deliver the film sheets between said last mentioned rollers.

5. The apparatus according to claim 4 wherein said gripping jaws move backwards at a greater speed than the highest peripheral speed of said inlet rollers whereby the film sheets are pulled from said jaws.

6. The apparatus according to claim 3 wherein said inlet rollers, said outlet rollers and said intermediate rollers have aligned wheels at one side drivingly connected to each other by an endless drive member actuated by said first drive motor.

7. The apparatus according to claim 6 wherein said inlet rollers and said intermediate rollers have aligned wheels at the other side connected to each other by an endless drive member actuated by said second drive motor.

References Cited by the Examiner

UNITED STATES PATENTS 2,769,369   11/56   Oiler _____ 95—14 X

RALPH G. NILSON, *Primary Examiner.*